United States Patent [19]

Pardue et al.

[11] Patent Number: 4,833,564
[45] Date of Patent: May 23, 1989

[54] CURRENT SENSING RELAY CIRCUIT WITH ADJUSTABLE SENSITIVITY AND TRACKING TEST CIRCUIT

[75] Inventors: Von G. Pardue, Duluth; William E. May, Lawrenceville; Jerry M. Green, Dunwood, all of Ga.

[73] Assignee: Siemens Energy & Automation, Inc., Atlanta, Ga.

[21] Appl. No.: 100,691

[22] Filed: Sep. 24, 1987

[51] Int. Cl.[4] .............................................. H02H 3/08
[52] U.S. Cl. ...................................... 361/93; 361/42; 361/45; 361/94
[58] Field of Search ....................... 261/42, 44, 45, 87, 261/93, 94

[56] References Cited

U.S. PATENT DOCUMENTS

| 4,542,432 | 9/1985 | Nichols, III et al. | 361/44 |
| 4,568,997 | 2/1986 | Bienwald et al. | 361/45 |
| 4,578,732 | 3/1986 | Draper et al. | 361/45 |
| 4,618,907 | 10/1986 | Leopold | 361/45 |

Primary Examiner—Derek S. Jennings
Attorney, Agent, or Firm—Volker R. Ulbrich

[57] ABSTRACT

Ground fault interrupting circuit breaker (10) includes a sensing coil (20) which is the secondary winding of a current transformer having a core (18) and includes a test coil (22) also wound about the core with load conductors passing through the core. A current sensing circuit (30) compares the output from the sensing coil to a reference voltage which is adjustable to set the sensitivity of the breaker. A test circuit (42) generates in the test coil a test current whch has its magnitude determined by the same reference voltage which determines the sensitivity of the breaker, thus causing the test current to automatically track the sensitivity of the breaker without separate adjustment.

7 Claims, 2 Drawing Sheets

CURRENT SENSING RELAY CIRCUIT WITH ADJUSTABLE SENSITIVITY AND TRACKING TEST CIRCUIT

BACKGROUND OF THE INVENTION

The present invention relates to electronic circuits for sensing electrical current in a load conductor and relates more particularly to such circuits for use in a ground fault interrupting circuit breaker.

In a power system which is referenced to ground potential, all the current from the load is intended to return to the location of the breaker via a neutral wire. If any portion of the return current is absent at the breaker, then there must be a ground fault present which is permitting some other return path to be established to ground. A ground fault interrupting circuit breaker senses such a condition and interrupts the circuit in response thereto.

Ground faults in a ground-referenced power system are typically detected by monitoring the differential current in conductors feeding a load circuit. If such a system is operating normally, all current transmitted to the load will return on the conductors provided. This will result in a net zero current in all conductors at any instant in time if all conductor currents are summed, taking proper polarity into account. Any difference current is presumed to be returning to the source via a spurious ground path representing a "ground fault".

Differential current can be detected very simply by passing all load circuit conductors through a current sensor in the form of a current transformer. If all currents sum to zero, there will be no output from the current transformer secondary winding. Any differential current will produce an output that can be measured for ground fault detection. To test such a system, it is desirable to pass a test current with a known amplitude through the current transformer to produce an output in the secondary winding that should cause a prescribed response from the detection system. With this approach, all components of the system are tested under realistic conditions, leading to a high degree of confidence in the results.

Variations in both the load equipment and in the manner in which the loads are connected in a power system make it desirable that the sensitivity of the breaker be adjustable to suit its particular application. In addition, it is necessary to be able to readily test the operation of the breaker to assure that it is still functional and that the sensitivity is indeed as intended. A sure test of the entire circuit is to generate in the current transformer of the sensing circuit itself a current which somewhat exceeds the current threshold set by the sensitivity adjustment. However, when the sensitivity is adjusted to a different value the test current must also be changed.

There is a need for a current sensing relay circuit which has an adjustable sensitivity and which can also be readily and reliably tested.

SUMMARY OF THE INVENTION

In accordance with the present invention, a current sensing relay circuit which includes a current sensor coupled to a load current conductor, provides an output representative of the differential load current to a comparator. The comparator correlates the output with an adjustable reference voltage and generates an appropriate operational output signal. A test circuit, which includes a test current element magnetically coupled to the sensing element, is designed so that the magnitude of a test current generated in the sensing element by the test circuit is also dependent upon the same reference voltage. This arrangement forces the test current to automatically track the sensitivity so that it is always correct for a particular sensitivity setting. Only a single adjustment is needed for both sensitivity test current. This both reduces and improves the complexity and the safety of the circuit for use in circuit breakers, since it leaves less room for operator error in testing.

DETAILED DESCRIPTION OF PREFERRED EMBODIMENTS

Figure 1:
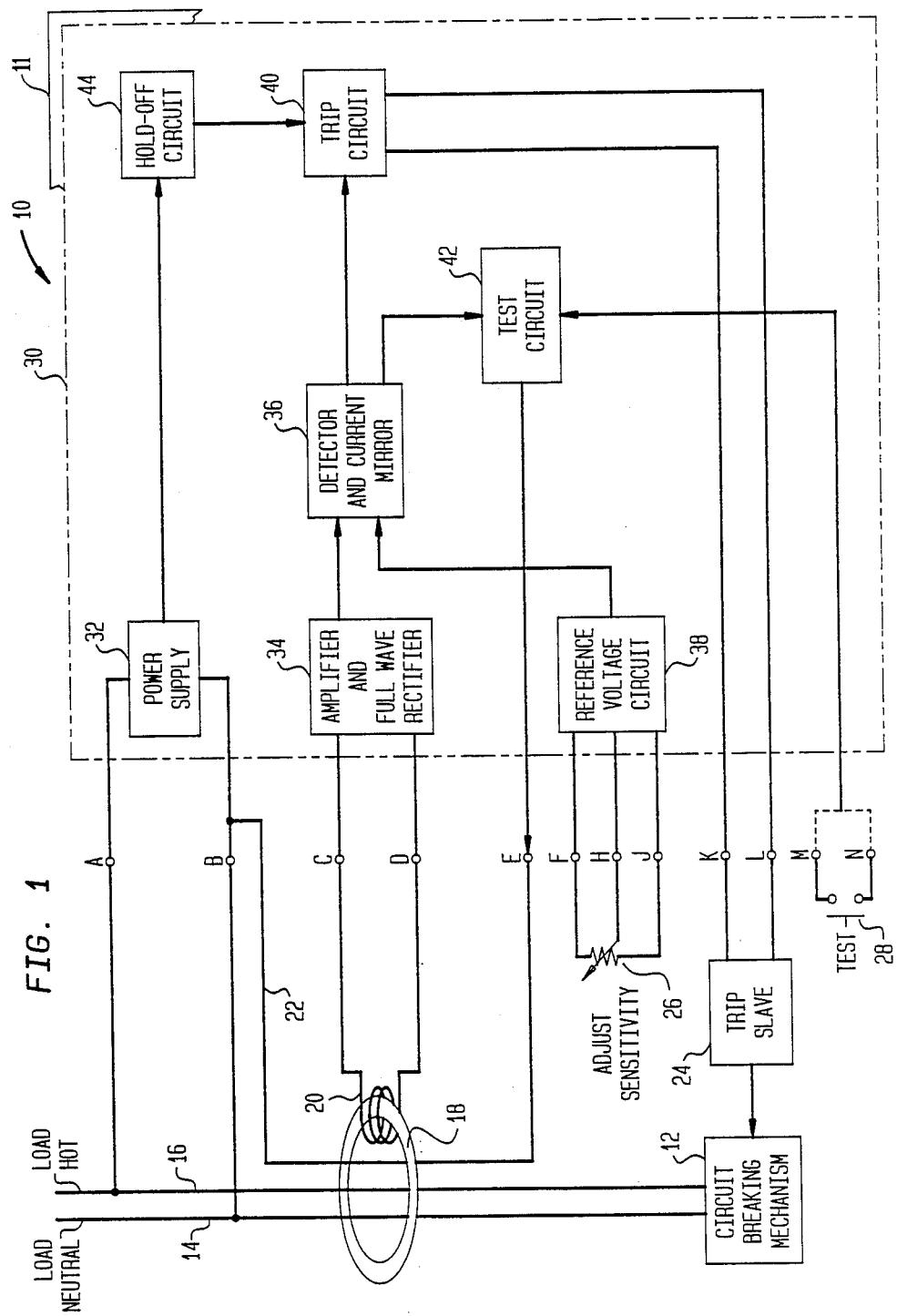
FIG. 1 is a schematic diagram partly in block form of a ground fault interrupting circuit breaker in accordance with one embodiment of the present invention.

One embodiment of the present invention is a ground fault interrupting circuit breaker 10 shown in FIG. 1 of the drawings. The breaker 10 is enclosed in a molded case 11, of which only a fragment is shown, and includes a breaking mechanism 12 which is connected to load conductors, in this case a load neutral conductor 14 and a load hot conductor 16. The load conductors 14, 16 pass through the core 18 of a current transformer which has a secondary winding 20 wrapped around it as a sensing coil. Also passing through the core 18 is a single loop test coil 22. A trip slave mechanism 24, which may be in the form of a solonoid, is arranged to cause the breaking mechanism 12 to trip in response to an electrical signal. The sensitivity of the current sensing for the breaker 10 can be adjusted by the adjustment 26, which may be in the form of a variable resistor. A test of the breaker is initiated by the test button 28. The elements described so far are connected to a set of electrical terminals A through N which, in turn, are connected to a current sensing circuit 30. A power supply circuit 32 supplies power to all the subcircuits which are shown as blocks in the diagram, although this is not shown as such in the diagram in order to avoid excessive lines. An amplifier and full wave rectifier 34 connected to terminals C and D, and thereby to the sensing coil 20, generates a voltage representative of the net current in the load neutral 14 load hot 16 and test 22 conductors. This output is passed to a detector and a current mirror 36, in which this output voltage is compared to a control voltage in the form of a reference voltage from the reference voltage circuit 38. The reference voltage of the circuit 38 can be adjusted by means of the adjustment 26. If the sensed current is greater than the threshold reference value as set by the reference voltage circuit 38, then the detector 36 provides a high output to a trip circuit 40. Outputs of the trip circuit 40 are connected to terminals K and L which operate the trip slave 24 to result in a breaking action of the mechanism 12. The current mirror of the detector 36 provides a control current to the the test circuit 42 which is proportional to the reference voltage from the reference voltage circuit 38. In response to a test command from the test button 28, the test circuit 42 will generate a test current in the coil 22 via terminal E to generate a correspsonding current in the sensing coil 20, to which it is coupled magnetically by the core 18. A hold-off circuit 44 connected to the trip circuit 40 permits a controlled delay of the tripping action of the breaker. It can be seen that by taking into consideration the ratio of turns of the sensing coil 20 to those of the test coil 22 and to other parameters of the test circuit, the current mirror action of the detector 36 can be chosen in such a manner that the test current generated by the test circuit 42 will properly track the detector 36 sensitivity as adjusted by the adjustment 26.

Because the test coil 22 generates a net current through the core 18, the resulting test conditions result in a realistic testing of all the components of the breaker 10. An operator decision involving a selection of an appropriate test current amplitude to match a selected sensitivity setting is eliminated. This reduces the possibility of a system malfunction going undetected and thereby maintains the intended protective function.

Figure 2:
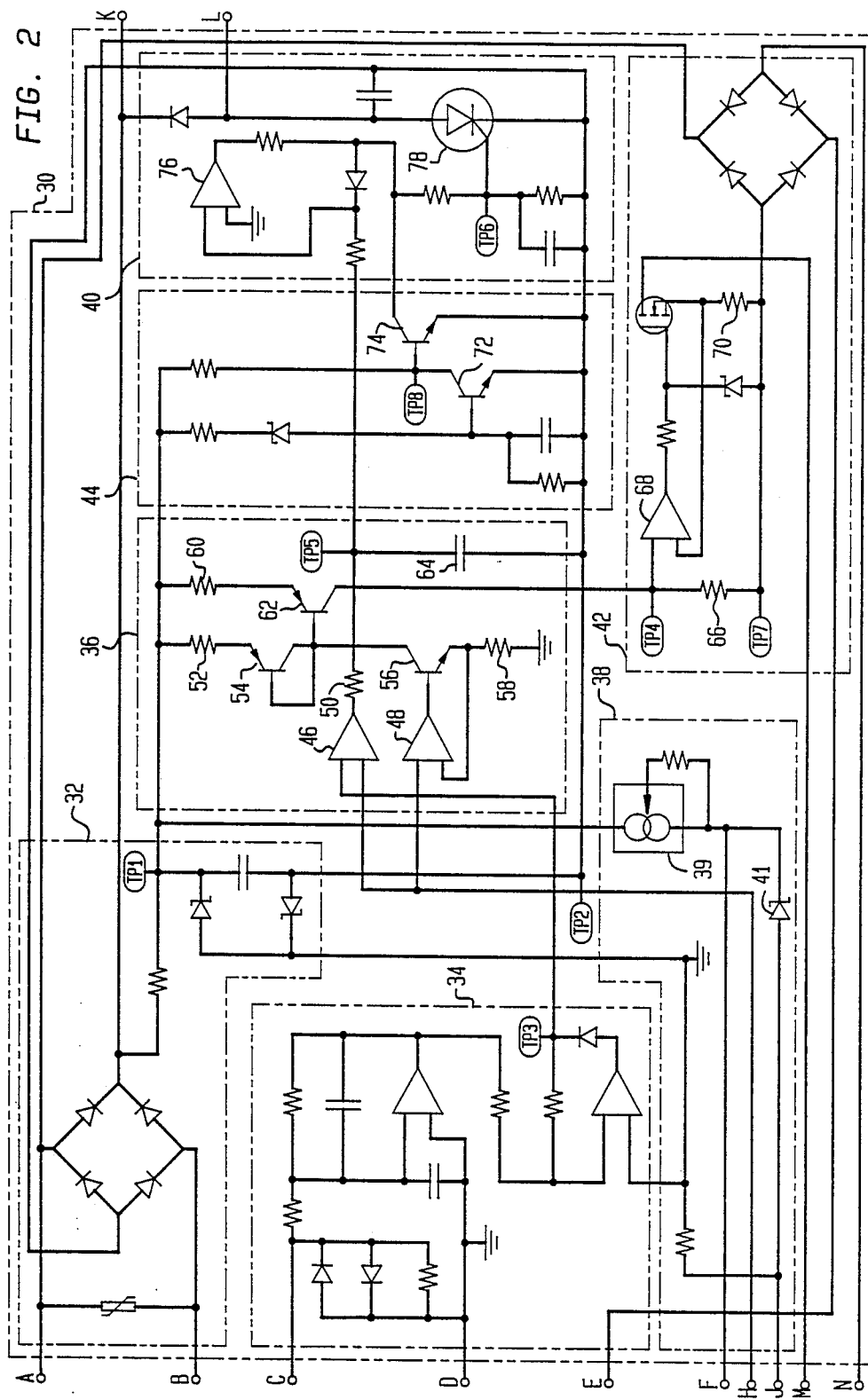
FIG. 2 is a schematic circuit diagram detailing one form of a current sensing circuit of the circuit breaker of FIG. 1.

The various subcircuits of the current sensing circuit 30 which are shown as blocks are ones which can be readily designed by those skilled in the art of electronic circuit design. However, for the sake of completeness, there is shown in FIG. 2 a detailed example of a current sensing circuit 30 with its various inputs and outputs related to the FIG. 1 structure by their connections to the corresponding terminals A through N. Subcircuits of the circuit 30 which correspond to the blocks of FIG. 1 are also correspondingly numbered.

The amplifier and full wave rectifier subcircuit 34 is a well-known fixed gain amplifier and full wave rectifier circuit equipped with high frequency noise and transient protection to protect against unwanted "trips".

The reference voltage subcircuit 38 is a well-known current-stabilized, adjustable voltage reference which determines both trip sensitivity and test circuit current levels. It includes a commercially available temperature-stabilized current source 39 for eliminating current fluctuations through a zener diode 41.

The detector and current mirror subcircuit 36 performs several functions using input signals received for the subcircuits 34 and 38. These functions are conversion of fault signal level to pulse width; conversion of reference signal level to scaled current and current mirroring; and pulse width delay. A more detailed description of the curcuit 36 follows.

A level comparator-to-pulsewidth converter means 46 produces a pulsewidth modulated output which is proportional to the amount of time the fault signal at TP3 exceeds the variable reference signal developed at pin H. That output is fed to a time discriminator circuit means 50 and 64, which requires that trip signals of sufficient duration are present before a trip signal TP5 is applied to the trip circuit 40.

Simultaneously, a buffer/scaler circuit means 48,56,58 uses negative feedback to produce a scaled current proportional to the reference level, hence tracking the trip sensitivity, and forces the current mirror means 52,54,60, and 62 to deliver the scaled current signal to TP4 of the test circuit 42.

A secondary function of the current mirror's output transistor 62 is to perform a level-shifting function, since the trip signal common TP2 and the test signal common TP7 are at different potentials. Such a split common arrangement is used to minimize the number of high-power parts needed to safely provide high test currents.

In the test circuit 42, a resistor 66 converts the reference-tracking scaled current into a test voltage which causes a negative feedback amplifier 68 to try to force a tracking test current through the sampling resistor 70. Thus, when the test switch 28 of FIG. 1 is closed, a test current whose amplitude tracks the selectable trip sensitivity is caused to flow via terminals E and B of FIG. 1 through the sensor 18 and causes a properly functioning ground fault interrupter to trip. This opens the AC mains.

A hold-off circuit 44 is activated with the application of power. The test point TP8 is at a VBE (voltage between base and emitter) until the system power supply reaches approximately 75% of its normal output level. Thus, during the transient turn-on period, TP6 is clamped at a low potential. After this initial transient period, clamping transistor 72 inhibits the transistor 74 to allow the trip circuit 40 to become operational.

The trip circuit 40 employs a level detecting latch 76, which responds to a proper trip signal at TP5 to drive a dv/dt-guarded switching element 78 which, in turn, activates a trip solenoid connected between terminals K and L, thus achieving a mechanical trip function.

While the sensing circuit above is described in terms of a ground fault interrupting circuit breaker, it should be understood that it may have other applications. The sensing element itself may also be in some form other than that of the sensing coil 20. The test element may also be an element other than a test coil 22. For example, it may be some means of generating a current directly in the amplifier 34 itself, rather than beginning at the sensing element, although this would have the disadvantage of eliminating the sensing element from the test. An important aspect of the invention is that, regardless of the means used for testing and for sensing, the magnitude of the test current is caused to automatically track changes in the sensitivity setting of the circuit 30.

We claim:

1. A relay circuit which senses electrical current, comprising:
   current sensing means for generating a sensing voltage representative of a load current being measured, the sensing means including a sensing element coupled to a load current conductor;
   comparator means for comparing a voltage output of the current sensing means to an adjustable reference voltage and generating an operational output in response to the comparison;
   test means for selectively generating in the current sensing means a test current having a magnitude determined by the reference voltage.

2. The circuit of claim 1, the test means comprising a circuit including a test current element magnetically coupled to the sensing element, so that a test current introduced in the test current element results in a proportional current in the sensing element.

3. The circuit of claim 2, wherein the sensing element is a current transformer coil.

4. The circuit of claim 3 wherein the test element is a coil around a magnetic core common to the sensing coil.

5. The circuit of claim 4 wherein the operational output is connected as the input of a circuit breaker tripping means.

6. A ground fault interrupting circuit breaker, comprising:
   a molded case of insulating material;
   a circuit breaking mechanism inside the case;

a trip means connected to the breaker mechanism to cause a breaking in response to a trip signal at an input of the trip mechanism;

a ground fault sensing circuit having an output connected as the input to the trip mechanism, wherein the sensing circuit comprises:

a relay circuit which senses electrical current, comprising:

current sensing means for generating a sensing voltage representative of a current being measured, the sensing means including a sensing coil coupled to a load current conductor which carries the current being sensed;

comparator means for comparing an output voltage of the current sensing means to an adjustable reference voltage and generating an operational output to the trip means in response to the comparison;

test circuit means for selectively generating a test current having a magnitude determined by the reference voltage in the sensing coil of the sensing means, the test circuit including a test current coil magnetically coupled to the sensing element, so that a test current introduced in the test current coil results in a proportional current in the sensing coil.

7. The breaker of claim 6, comprising a mirror circuit means for generating a sensitivity control voltage and a test current control voltage from the reference voltage.

* * * * *